United States Patent
Eshon et al.

(10) Patent No.: US 12,060,267 B2
(45) Date of Patent: Aug. 13, 2024

(54) BORON NITRIDE NANOSTRUCTURES

(71) Applicant: THE UNIVERSITY OF WESTERN AUSTRALIA, Crawley (AU)

(72) Inventors: Sehrina Muzahid Eshon, Crawley (AU); Hui Tong Chua, Crawley (AU); Weike Zhang, Crawley (AU)

(73) Assignee: ONALBA PTY LTD, Perth (AU)

( * ) Notice: Subject to any disclaimer, the term of this patent is extended or adjusted under 35 U.S.C. 154(b) by 496 days.

(21) Appl. No.: 17/294,081

(22) PCT Filed: Nov. 15, 2019

(86) PCT No.: PCT/AU2019/051256
§ 371 (c)(1),
(2) Date: May 14, 2021

(87) PCT Pub. No.: WO2020/097688
PCT Pub. Date: May 22, 2020

(65) Prior Publication Data
US 2022/0009779 A1    Jan. 13, 2022

(30) Foreign Application Priority Data

Nov. 16, 2018   (AU) .................. 2018904384

(51) Int. Cl.
*C01B 21/064* (2006.01)
*B82Y 40/00* (2011.01)
(52) U.S. Cl.
CPC ........... *C01B 21/0648* (2013.01); *B82Y 40/00* (2013.01); *C01P 2002/01* (2013.01);
(Continued)

(58) Field of Classification Search
USPC ........................................................ 423/290
See application file for complete search history.

(56) References Cited

U.S. PATENT DOCUMENTS

| | | |
|---|---|---|
| 6,586,093 B1 | 7/2003 | Laude |
| 8,753,578 B1 | 6/2014 | Smith |
| 10,005,668 B1 | 6/2018 | Hung et al. |

FOREIGN PATENT DOCUMENTS

| | | |
|---|---|---|
| CN | 103787287 A | 5/2014 |
| JP | 2003-512192 A | 4/2003 |
| MX | 2014004754 A | 10/2015 |

OTHER PUBLICATIONS

Shojiro Komatsu, Yoshiki Shimizu, Yusuke Moriyoshi, Katsuyuki Okada, Mamoru Mitomo; Preparation of boron nitride nanocapsules by plasma-assisted pulsed laser deposition. J. Appl. Phys. May 1, 2002; 91 (9): 6181-6184. https://doi.org/10.1063/1.1461889 (Year: 2002).*

(Continued)

*Primary Examiner* — Anthony J Zimmer
*Assistant Examiner* — Zachary John Baum
(74) *Attorney, Agent, or Firm* — Carter, DeLuca & Farrell LLP

(57) ABSTRACT

The present invention relates to a method for producing boron nitride nanostructures, the method comprising subjecting boron nitride precursor material to lamp ablation within an adiabatic radiative shielding environment. The nanostructures produced may include nano-onion structures. The boron nitride precursor material subjected to lamp ablation may include amorphous boron nitride, hexagonal boron nitride, cubic boron nitride, wurtzite boron nitride or a combination of two or more thereof.

20 Claims, 7 Drawing Sheets

(52) U.S. Cl.
CPC ...... *C01P 2002/70* (2013.01); *C01P 2002/85* (2013.01); *C01P 2002/90* (2013.01); *C01P 2004/03* (2013.01); *C01P 2004/04* (2013.01); *C01P 2004/16* (2013.01); *C01P 2004/24* (2013.01); *C01P 2004/30* (2013.01); *C01P 2004/64* (2013.01)

(56) References Cited

OTHER PUBLICATIONS

Woi W:S., "Lamp Ablation Syntheses of Nanomaterials" Masters Thesis—University of Western Australia 2016. [retrieved from the internet Jan. 23, 2020]. (Year: 2016).*

Goodfellow Cambridge Limited—UK. "Boron nitride sputtering target disc 3mm thick." [retrieved from https://www.goodfellow.com/p/b-60-st-000100/boron-nitride-sputtering-target-disc Nov. 1, 2023]. (Year: 2023).*

Goldberg, D., et al. "Boron nitride nanostructures formed by ultra-high-repetition rate laser ablation." Diamond and Related Materials 12 (2003) 1269-1274 (Year: 2003).*

Chen, Y et. al., "Growth and characterization of porous sp2-BN films with hollow spheres under hydrogen etching effect via borazane thermal CVD" Applied Surface Science (Apr. 2018) pp. 314-321, vol. 452.

Pan, Y. et. al., "Boron Nitride Nanocages Synthesized by a Moderate Thermochemical Approach" Small (Dec. 2005) pp. 1199-1203, vol. 1, No. 12.

Firestein, K. L. et. al., "Compressive properties of hollow BN nanoparticles: theoretical modeling and testing using a high-resolution transmission electron microscope" Nanoscale (Mar. 2018) pp. 8099-8105, vol. 10.

Bernard, S. et. al., "High-yield synthesis of hollow boron nitride nano-polyhedrons" J. Mater. Chem. (Apr. 2011) pp. 8694-8699, vol. 21.

Zhong, B. et. al., "Boron nitride hollow nanospheres: Synthesis, formation mechanism and dielectric property" Materials Research Bulletin (Apr. 2015) pp. 61-67, vol. 64.

Lian, G. et. al., "Controlled fabrication of ultrathin-shell BN hollow spheres with excellent performance in hydrogen storage and waste-water treatment" Energy Environ. Sci. (Feb. 2012) pp. 7072-7080, vol. 5.

Terrones, H. et al., "Curved nanostructured materials" New Journal of Physics (Oct. 2003) pp. 126.1-126.37, vol. 5, No. 1.

Kononenko, V. V. et al., "Ablation of hexagonal boron nitride by UV laser radiation" Quantum Electronics (Nov. 2018) pp. 996-999, vol. 48, No. 11.

Extended European Search Report issued in corresponding EP Patent Application No. 19883377.4, dated Jul. 21, 2022, pp. 1-8.

Eshon, Sehrina, "Characterization of Nanomaterials Synthesized Via Lamp Ablation" This thesis is presented for the degree of master of philosophy at the University of Western Australia, Department of chemical engineering, published on Jul. 2, 2019, https://research-repository.uwa.edu.au/en/publications/characterization-of-nanomaterials-synthesized-via-lamp-ablation, pp. 1-101.

International Search Report issued in corresponding International Application No. PCT/AU2019/051256, dated Jan. 29, 2020, pp. 1-4.

Levy M. et al, "Synthesis of Inorganic Fullerene-like Nanostructures by Concentrated Solar and Artificial Light" Israel Journal of Chemistry (Oct. 2010) pp. 417-425, vol. 50.

Bernard S. et al, "High-yield Synthesis of Hollow Boron Nitride Nanopolyhedrons" Journal of Materials Chemistry, (Apr. 2011) pp. 8694-8699, vol. 21.

Eshon S. et al, "Panorama of Boron Nitride Nanostructures via Lamp Ablation" Nano Research (Mar. 2019) pp. 557-562, vol. 12, Issue 3.

Lu H-B. et al, "High-yield Synthesis of Silicon Carbide Nanowires by Solar and Lamp Ablation" Nanotechnology (Jul. 2013) pp. 1-8, vol. 24.

Woi W.S., "Lamp Ablation Syntheses ofNanomaterials" Masters Thesis—University of Western Australia (2016) [retrieved from the internet Jan. 23, 2020] pp. 1-89.

International Preliminary Report on Patentability issued in corresponding International Application No. PCT/AU2019/051256, dated May 18, 2021, pp. 1-6.

Australian Search Report issued in corresponding Australian National Application No. 2018904384, dated May 21, 2019, pp. 1-6.

Notice of Reasons for Refusal issued by the Japanese Patent Office on Oct. 3, 2023 in corresponding JP Patent Application No. 2021-527139, with English translation.

* cited by examiner

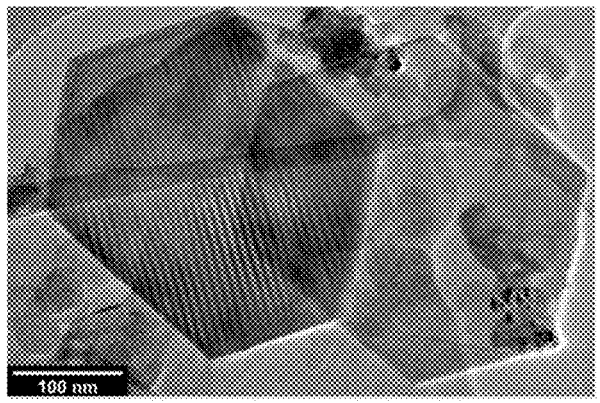
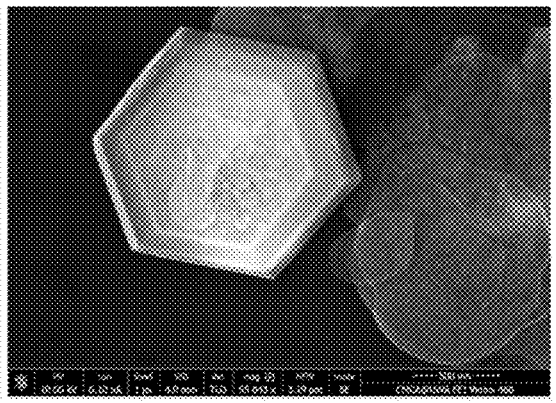
FIG. 4A  FIG. 4B
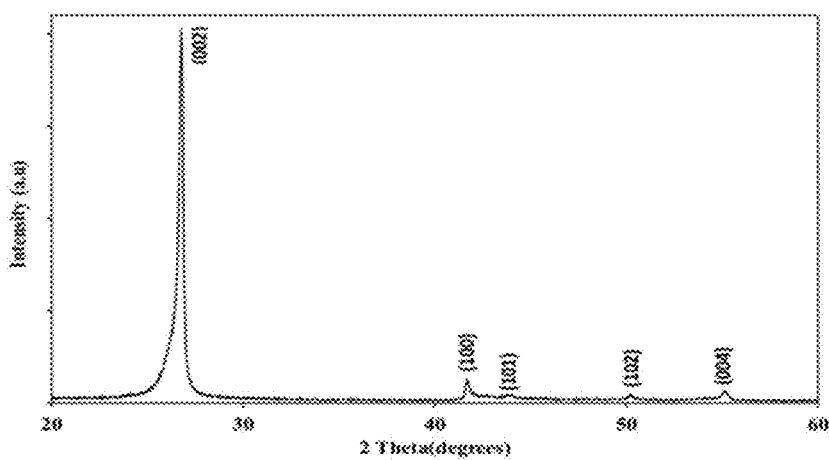
FIG. 4C

BORON NITRIDE NANOSTRUCTURES

CROSS REFERENCE TO RELATED APPLICATIONS

The present application is a national stage application of International Application No. PCT/AU2019/051256, filed Nov. 15, 2019, which claims the benefit and priority of Australian Patent Application No. 2018904384, filed Nov. 16, 2018, the entire contents of each of which are hereby incorporated by reference herein in their entirety.

FIELD OF THE INVENTION

The present invention relates in general to boron nitride nanostructures. In particular, the invention relates to a method of preparing boron nitride nanostructures.

BACKGROUND OF THE INVENTION

Boron nitride (BN) has been the subject of considerable research and development due to its plethora of remarkable physiochemical properties such as high-temperature stability, resistance to oxidation and corrosion, chemical durability, high thermal conductivity, a large specific surface area, a low dielectric constant and a wide bandgap of 5-6 eV. Structures derived from boron nitride can also exhibit biocompatibility and are relatively non-toxic because of their chemical inertness and structural stability.

Boron nitride exists in various polymorphic forms. For example, boron nitride can exist in an amorphous form (a-BN), a hexagonal form (h-BN), a cubic form (c-BN) and a wurtzite form (w-BN).

Boron nitride is known to form a variety of metastable nanostructures such as nano-tubes, nano-ribbons, nano-whiskers, nano-cones, nano-sheets, and nano-spheres (also known in the art as nano-onions). The nano-onion structures may be hollow.

The spherical morphology of nano-onions and their relatively low density and high specific surface area makes them excellent candidates for various applications such as lubricants and lubricant additives.

Although boron nitride nano-tubes and nano-sheets have been widely investigated, there are limited publications relating to boron nitride nano-onions owing to their difficulty of manufacture.

Reported methods for producing boron nitride nanostructures include pulsed laser ablation, chemical vapour deposition, electron beam irradiation and pyrolysis. However, most of those procedures require multiple steps and/or components such as catalysts and templates, and/or complex facilities.

Chemical synthetic techniques have also been used to produce boron nitride nanostructures. However, such synthetic approaches are generally complex, provide poor product yield and purity and some techniques employ highly toxic chemicals such as $NaN_3$.

Methods utilising concentrated light energy have also been used to synthesise boron nitride nanostructures, however, those methods were not reported to produce nano-onions. In addition, those methods generally employ a complex set-up.

Accordingly, there remains an opportunity to develop methodology for producing boron nitride nanostructures that is relatively simple, environmentally friendly, efficient and scalable.

SUMMARY OF THE INVENTION

The present invention provides a method for producing boron nitride nanostructures, the method comprising subjecting boron nitride precursor material to lamp ablation within an adiabatic radiative shielding environment.

It has now been found that subjecting boron nitride precursor material to lamp ablation within an adiabatic radiative shielding environment surprisingly produces a variety of boron nitride nanostructures. Nanostructures identified include nano-platelets, exfoliated nano-sheets, nano-horns, nano-rods and nano-onions.

Surprisingly, the method according to the invention is particularly well suited to producing nano-onion structures.

Lamp ablation uses high flux bright light to irradiate precursor materials to achieve reactions that are not attainable in conventional ovens or alternative pathways.

In one embodiment, the adiabatic radiative shielding environment is in the form of a vessel made from material comprising fused quartz.

In a further embodiment, the vessel is hermetically sealed and has two or more layers of material that are each spaced apart and each hermetically sealed.

In another embodiment, the vessel is in the form of a tube or ampoule.

In yet another embodiment, the nanostructures produced comprise nano-onion structures.

In a further embodiment, the nanostructures produced are crystalline.

In yet a further embodiment, the nanostructures produced comprise at least 50 wt %, or at least 60 wt %, or at least 70 wt %, or at least 80 wt %, or at least 90 wt %, or at least 95 wt %, nano-onion structures.

The method according to the invention is advantageously not complex to perform, is scalable and is environmentally friendly in that it only requires the use of lamp ablation.

Further aspects and embodiments of the invention are discussed in more detail below.

BRIEF DESCRIPTION OF THE DRAWINGS

The invention is described herein with reference to the following non-limiting drawings in which:

FIG. 4A illustrates a TEM pattern of h-BN precursor material, FIG. 4B illustrates a SEM pattern of h-BN precursor material, and FIG. 4C illustrates a XRD pattern of h-BN precursor material;

DETAILED DESCRIPTION OF THE INVENTION

The present invention provides a method for producing boron nitride nanostructures. By a boron nitride "nanostructure" is meant a physical form of boron nitride having at least one dimension less than 100 nm.

The method according to the invention can produce a variety of boron nitride nanostructures. Those nanostructures include nano-horns, nano-rods, nano-sheets, nano-platelets and nano-onions.

The method according to the invention has surprisingly been found to be particularly well suited for producing boron nitride nano-onion structures.

In one embodiment of the invention, the nanostructures produced comprise nano-onion structures.

Without wishing to be limited by theory, it is believed the formation of such nano-onion structures is driven by the non-coherent light emission from the lamp ablation which, upon impinging on the boron nitride precursor material, generates plate-like circular nanostructures that exfoliate into thinner boron nitride nano-sheets. Those boron nitride nano-sheets then rearrange into a more stable nano-onion structure.

Figure 1:
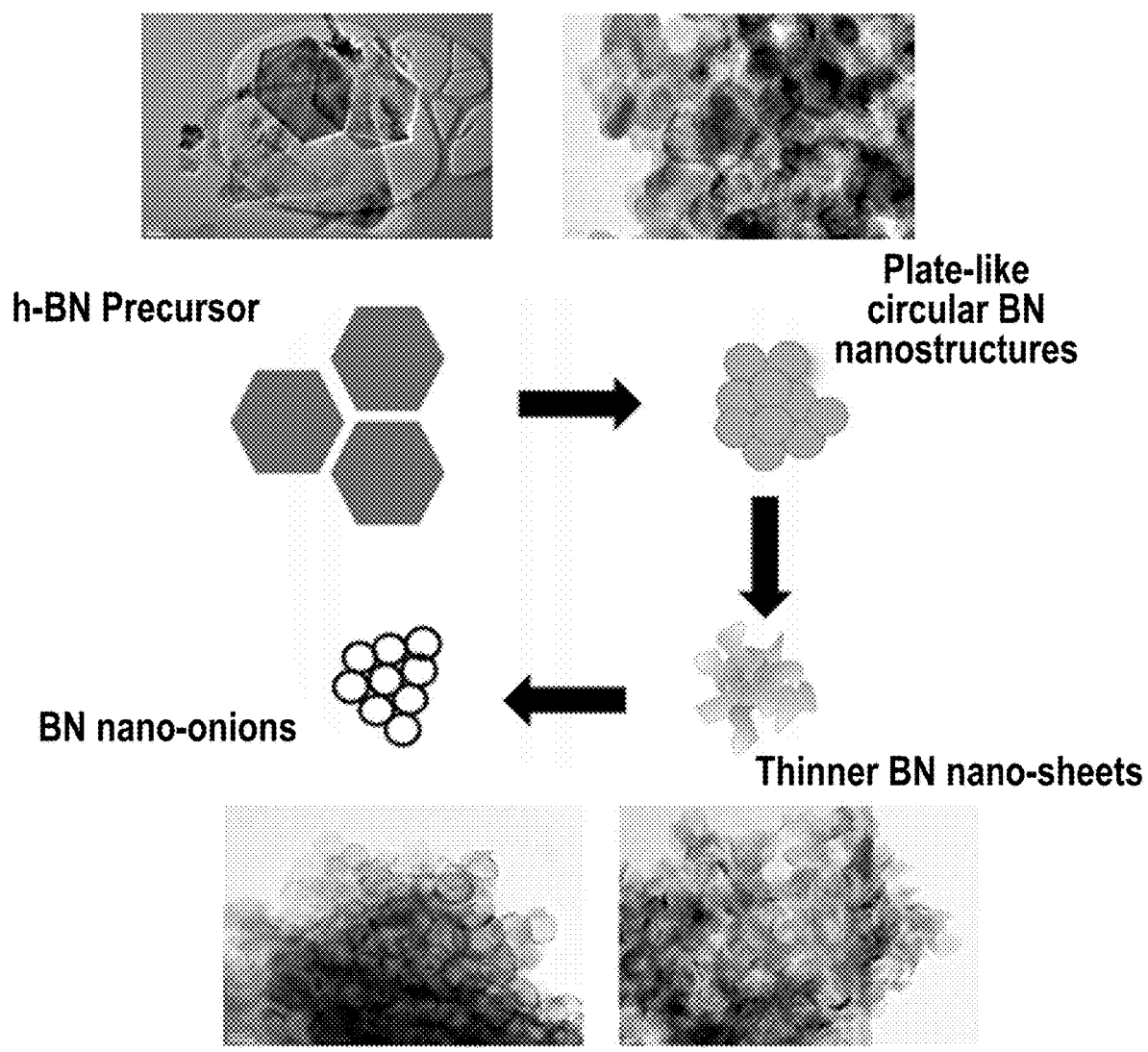
FIG. 1 is a schematic illustration of how boron nitride nano-onion structures are believed to be produced in accordance with the invention.

That proposed mechanism for the formation of nano-onion structures according to the method of the invention is schematically illustrated in FIG. 1. With reference to FIG. 1, h-BN is used as a precursor material and subjected to lamp ablation. That precursor material is believed to initially form plate-like circular boron nitride nanostructures which exfoliate into thinner boron nitride nano-sheets. The boron nitride nano-sheets are then believed to rearrange into more stable nano-onion structures. As will be discussed below in more detail in the examples section, that proposition is supported by experimental evidence which identified incompletely-closed nano-onion structures lining exfoliated boron nitride nano-sheets.

The method according to the invention can advantageously produce a relatively large proportion of boron nitride nano-onion structures.

In one embodiment, the nanostructures produced comprise at least 50 wt %, or at least 60 wt %, or at least 70 wt %, or at least 80 wt %, or at least 90 wt %, or at least 95 wt % nano-onion structures.

As is well known to those skilled in the art, boron nitride nano-onions have a nano-spherical structure comprising concentric shells of boron nitride sheets.

The nano-onion structures may be hollow.

In one embodiment, all dimensions of the nanostructures produced are less than 100 nm.

In a further embodiment, the nanostructures produced comprise nano-onion structures having an average diameter ranging from about 15 nm to about 80 nm, or about 20 nm to about 60 nm.

The nanostructures produced according to the invention may be crystalline.

The nanostructures produced according to the invention have characteristic features known by those skilled in the art. For example, the nano-horn structures have a projection of a hollow tube where one end is open and the other end is tapered and closed. The average length of the nano-horns is typically about 10 nm with an average diameter of about 5 nm. The average length of the nano-rods is typically about 15 nm with an average diameter of about 5 nm. The nano-sheets typically have a largest average length dimension of about 50 nm.

The method according to the invention comprises subjecting boron nitride precursor material to lamp ablation. By being a "precursor material" is meant a boron nitride source material that is subjected to lamp ablation so as to form the boron nitride nanostructures.

Those skilled in the art will appreciate that boron nitride exists in varying polymorphic forms. For example, it may present in an amorphous form, a hexagonal form, a cubic form or a wurtzite form.

There is no particular limitation on the type of boron nitride precursor material that may be used in accordance with the invention.

In one embodiment, the boron nitride precursor material subjected to lamp ablation according to the invention comprises amorphous boron nitride, hexagonal boron nitride, cubic boron nitride, wurtzite boron nitride or a combination of two or more thereof.

In a further embodiment, the boron nitride precursor material subjected to lamp ablation comprises hexagonal boron nitride.

Typically, the boron nitride precursor material subjected to the lamp ablation will be in powdered form.

The boron nitride precursor material subjected to the lamp ablation may itself comprise or be in the form of boron nitride nanostructures. Where the boron nitride precursor material comprises boron nitride nanostructures, it will be appreciated those nanostructures (as a precursor material) will, upon being subjected to lamp ablation according the invention, be transformed or converted into different nanostructures. For example, where the boron nitride precursor material comprises boron nitride nano-horns, upon being subjected to lamp ablation according the invention those nano-horn structures will be transformed or converted into different nanostructures, such as nano-onion structures. Accordingly, the method according to the invention produces boron nitride nanostructures even when the boron nitride precursor material itself comprises boron nitride nanostructures.

In one embodiment, the boron nitride precursor material subjected to lamp ablation comprises boron nitride nano-horns, boron nitride nano-rods, boron nitride nano-tubes, boron nitride nano-sheets, boron nitride nano-platelets, boron nitride nano-onions or a combination of two or more thereof.

The method according to the invention includes subjecting boron nitride precursor material to lamp ablation within an adiabatic radiative shielding environment. Without wishing to be limited by theory, the adiabatic radiative shielding environment is believed to be an important factor in providing for the boron nitride nanostructures.

By the radiative shielding environment being "adiabatic" is meant that substantially no or very little heat is lost from the radiative shielding environment. In that context the "environment" is intended to mean a space that is defined by the boundaries of a suitable radiative shielding material. The radiative shielding material therefore functions as a highly efficient insulating barrier to the loss of heat. Those skilled in the art are well versed in materials that can provide for such a radiative shielding environment. Examples of suitable radiative shielding environment are described herein.

The adiabatic radiative shielding environment may be provided in the form of a vessel.

The vessel may be hermetically sealed and have two or more layers of material which are each spaced apart and each hermetically sealed. The hermetically sealed, spaced-apart, multiple layers of material create an adiabatic radiative shielding environment. Without wishing to be limited by theory, the adiabatic radiative shielding environment is believed to promote slow cooling of the ablation products at elevated temperatures, similar to an annealing heat treatment. That in turn is believed to enable such unique nanostructures to be formed.

The adiabatic radiative shielding environment may in part be opaque or translucent, but it will of course need to provide a substantially transparent section to the lamp emission for the boron nitride precursor material to undergo lamp ablation. For example, the adiabatic radiative shielding environment may be in the form of a vessel such as an ampoule, where at least a portion of the vessel is transparent to the lamp emission, for example the tip of the vessel where the boron nitride precursor material is located. The portion of the vessel that is transparent to the lamp emission will typically be located at or proximate to the focal point of the lamp.

Figure 3A:
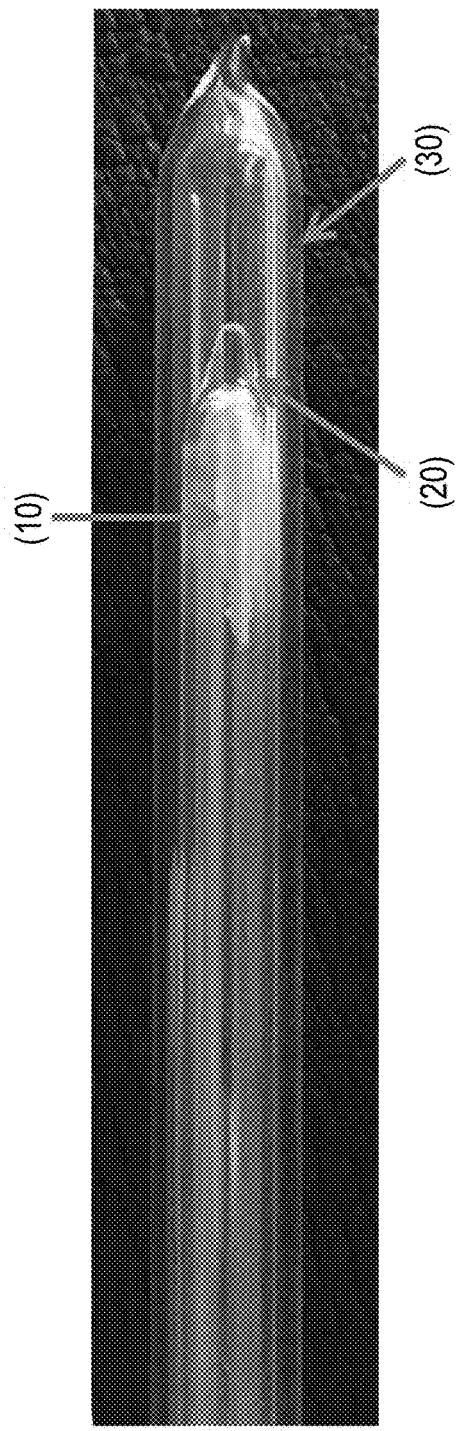
FIGS. 3A and 3B illustrate an adiabatic radiative shielding environment in the form of an ampoule configuration with hermetically sealed layers which are spaced apart that may be used in accordance with the invention.
Figure 3B:
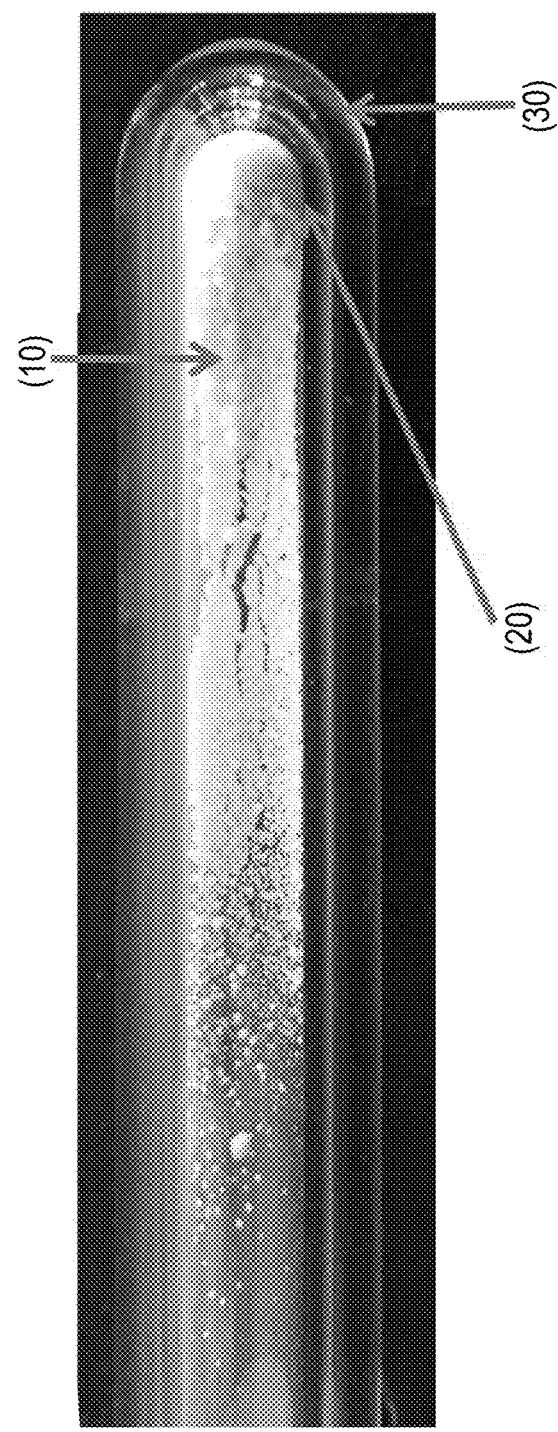

An example of a adiabatic radiative shielding environment suitable for use in accordance with the invention is shown in FIG. 3. FIGS. 3(a) and (b) illustrate an adiabatic radiative shielding environment in the form of an ampoule configuration with hermetically sealed layers which are spaced apart. In FIGS. 3(a) and (b) (10) points to the boron nitride precursor material, (20) points to a hermetically sealed inner layer of used quartz, and (30) points to a hermetically sealed outer layer of fused quartz. The portion of the vessel shown is transparent to the lamp emission.

In one embodiment, the adiabatic radiative shielding environment is in the form of a vessel comprising a section made from fused quartz.

Such fused quartz will be transparent to the lamp emission.

It is preferred the fused quartz used have a high infrared (IR) transmittance.

Examples of suitable fused quartz include grades GE214 and GE214A.

The boron nitride precursor material will generally be sealed within an adiabatic radiative shielding environment prior to it being subjected to lamp ablation. The adiabatic radiative shielding environment will generally be evacuated prior to it being sealed.

For example, the boron nitride precursor material to be subjected to the lamp ablation may be located within an adiabatic radiative shielding environment by being sealed and evacuated in a quartz glass tube or ampoule.

In one embodiment, lamp ablation of the boron nitride precursor material is conducted at a pressure less than atmospheric pressure. For example, that pressure may be within the range of about 100 mbar to about $1 \times 10^{-3}$ mbar.

It can be desirable to remove any moisture from the boron nitride precursor material prior to it being subjected to lamp ablation.

In one embodiment, the boron nitride precursor material subjected to lamp ablation is substantially anhydrous.

It can be desirable to subject the boron nitride precursor material to lamp ablation under an inert atmosphere.

In one embodiment, the boron nitride precursor material is subjected to lamp ablation under an inert atmosphere.

The inert atmosphere may be provided by an inert gas such as nitrogen or argon.

Depending on how the boron nitride precursor material is physically located within the adiabatic radiative shielding environment, it may be necessary to rotate the boron nitride precursor material within the lamp emission or rotate the lamp emission around the boron nitride precursor material, so as to maximise exposure of the precursor material to the lamp emission. For example, where the adiabatic radiative shielding environment is a vessel such as a tube or ampoule, the tube or ampoule could simply be rotated within the lamp emission.

In one embodiment, the boron nitride precursor material subjected to lamp ablation is rotated within the lamp emission.

In another embodiment, the lamp emission is rotated around the boron nitride precursor material.

An important feature of the present invention is the use of lamp ablation to promote formation of the boron nitride nanostructures.

Lamp ablation is a technique known in the art and involves subjecting a target sample to a high energy non-coherent light source derived from the focussed emission of a gas-discharge lamp.

Gas discharge lamps typically comprise one or more noble gases such as argon, neon, krypton and xenon. The lamps may further comprise one or more other materials such as mercury or sodium. Gas discharge lamps also include so called metal halide lamps.

In one embodiment, the lamp ablation is performed using a xenon lamp, a xenon-mercury lamp, a high-pressure mercury lamp, or a metal halide lamp.

Lamps used in lamp ablation emit light energy and that light energy may conveniently be referred to as the lamp emission.

Generally, the luminous efficiency of a lamp used to provide for the lamp emission according to the present invention will range from about 15 to about 50 lm/W.

Suitable lamp sizes will generally range from about 75 to 10,000 W.

In one embodiment, the lamp used for the lamp ablation ranges from about 4,000W to about 10,000W, or from about 6,000W to about 10,000W, or from about 7,000W to about 10,000W.

Generally, the colour temperature of the lamp emission will range from about 5000 to about 6200K.

In one embodiment, the colour temperature of the lamp emission is about 6,000K.

In another embodiment, the boron nitride precursor material is subjected to lamp ablation at a temperature in the range between about 1,400 and about 3,500° C.

To perform lamp ablation emission from the lamp is typically reflected off one or more surfaces to form a focal point. The boron nitride precursor material may be placed within the adiabatic radiative shielding environment which is at or close to that focal point so as to promote lamp ablation in accordance with the invention. There will typically be a temperature gradient within the adiabatic radiative shielding environment, with the hottest point generally being located at or close to the focal point of the lamp, with the remaining part of the adiabatic radiative shielding environment progressively becoming cooler moving away from the focal point of the lamp.

The boron nitride nanostructures, particularly the nano-onion structures, will often form within the adiabatic radiative shielding environment some distance away from the focal point of the lamp (i.e. some distance away from the hottest region within the adiabatic radiative shielding environment.

In one embodiment, the boron nitride precursor material is located within the adiabatic radiative shielding environment which is at or proximate to a focal point of the lamp ablation and the boron nitride nanostructures, for example nano-onion structures, form within the adiabatic radiative shielding environment at a distance of about 6 cm to about 30 cm, or about 8 cm to about 12 cm, or about 12 cm to about 16 cm, or about 16 cm to about 20 cm, from the focal point.

By the boron nitride precursor material being located "proximate to" a focal point of the lamp ablation is meant the material is located within the radiative shielding environment which itself is sufficiently close to the focal point for the lamp ablation to occur. The distance from the focal point at which the radiative shielding environment containing the boron nitride precursor material can be placed to perform the invention can vary depending on the emission intensity of the lamp. The key point being that the temperature within the radiative shielding environment has to be sufficiently high to provide lamp ablation of the boron nitride precursor material located therein. As noted above, the temperature dissipates as one move away from the focal point. If the radiative shielding environment containing the boron nitride precursor material is not located at the focal point, it will generally be located at no more than about 2 cm, or 1.5 cm from the focal point.

The present invention can be performed using lamp ablation apparatus known in the art. For example, a specular ellipsoidal mirror may be used to reconstitute and focus the lamp emission to provide for the lamp ablation apparatus.

Figures 2A, 2B:
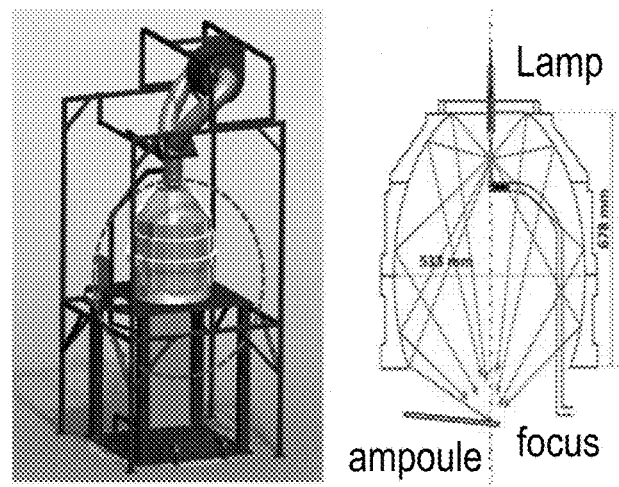
FIG. 2A illustrates a lamp ablation system that may be used in accordance with the invention and FIG. 2B shows a schematic illustration of a lamp surrounded by an ellipsoidal mirror assembly which directs the lamp emission to a focal point.

An example of a suitable lamp ablation apparatus for use in accordance with the present invention is shown in FIG. 2. With reference to FIG. 2, (a) shows an image of a lamp ablation apparatus suitable for use in accordance with the invention, and (b) represents a schematic illustration of the highlighted section in (a). FIG. 2(b) shows a schematic illustration of a lamp surrounded by an ellipsoidal mirror assembly which directs the lamp emission to a focal point. At that focal point is an adiabatic radiative shielding environment in the form of a sealed evacuated tube/ampoule containing boron nitride precursor material being subjected to lamp ablation according to the invention.

As previously discussed, when performing lamp ablation in accordance with the invention it will be desirable to maximise exposure of the boron nitride precursor material to the lamp emission. That may be achieved by rotating the boron nitride precursor material within the lamp emission. For example, that can be achieved by rotating the ampoule/tube shown in FIG. 2(b). Alternatively, the lamp ablation apparatus may be rotated around the boron nitride precursor material.

The time of exposure of the boron nitride precursor material to lamp ablation will vary depending upon factors such as the amount of boron nitride precursor material and the type of lamp ablation apparatus used. Those skilled in the art can readily determine a suitable time for subjecting the boron nitride precursor material to lamp ablation based on the specific equipment and conditions being used.

In one embodiment, the boron nitride precursor material is subjected to lamp ablation for at least 5 minutes, or at least 10 minutes, or at least 15 minutes, or at least 20 minutes, or at least 30 minutes, or at least 40 minutes, or at least 50 minutes, or at least 60 minutes.

If desired, the boron nitride precursor material may be subjected to multiple lamp ablation exposures. In other words, lamp ablation may be performed on the boron nitride precursor material multiple times.

There is no particular limitation on applications for the boron nitride nanostructures produced in accordance with the method of the invention. As the method of the invention is particularly well suited for producing boron nitride nano-onion structures, the product produced by the method can advantageously be used as a dry/solid lubricant. The nanostructures produced in accordance with the method of the invention may also be used in providing for anti-wear materials.

The following invention will hereinafter be described with reference to the following non-limiting examples.

Examples

Apparatus

Lamp ablation was performed using apparatus as shown in FIG. 2. A large specular ellipsoidal mirror reconstitutes the power density of the lamp derived plasma inside a nominally 7 kW continuous ultra-bright Xenon short-arc discharge lamp at a focal point. The peak irradiance in the focal region was ~6 W/mm$^2$ on an area of ~300 mm$^2$, as estimated by conjoining manufacturer lamp radiance data with raytrace simulation results.

General Procedure

The boron nitride precursor powder used was analytical grade h-BN, sealed in evacuated quartz ampoules consisting of two layers of fused quartz, each hermetically sealed. The irradiated ampoules were rotated by ~180° every 60 seconds to ensure that as much of the precursor powder as possible was directly irradiated. In separate experiments, continuous lamp ablation was conducted for 30 and 50 minutes.

The ampoules were subsequently cut into several sections, each of which was analysed separately. The ablated products were mixed with high-purity ethanol, and the solution was used to prepare samples that were analysed in a Transmission Electron Microscope (FEI Titan G2 80-200 TEM/STEM, JEOL 2100 TEM) and Scanning Electron Microscope (Verios XHR SEM).

Results and Discussion

To distinguish product nanostructures from the BN precursor material, TEM and SEM images of the h-BN precursor powder (FIGS. 4(a) and (b), respectively) were first generated. Those images confirm the distinct hexagonal shape and high purity of the precursor. FIG. 4(c) shows the X-ray diffraction (XRD) pattern, where the four peaks at d-spacings of 3.32805, 2.16692, 2.06206, 1.81562, 1.66521 Å can be indexed as h-BN for the planes (002), (100), (101), (102) and (004), respectively. The lattice constants are a=2.502 and c=6.656 Å, which are close to the literature values a=2.5044 and c=6.6562 (JCPDS card no. 34-421).

Figure 5:
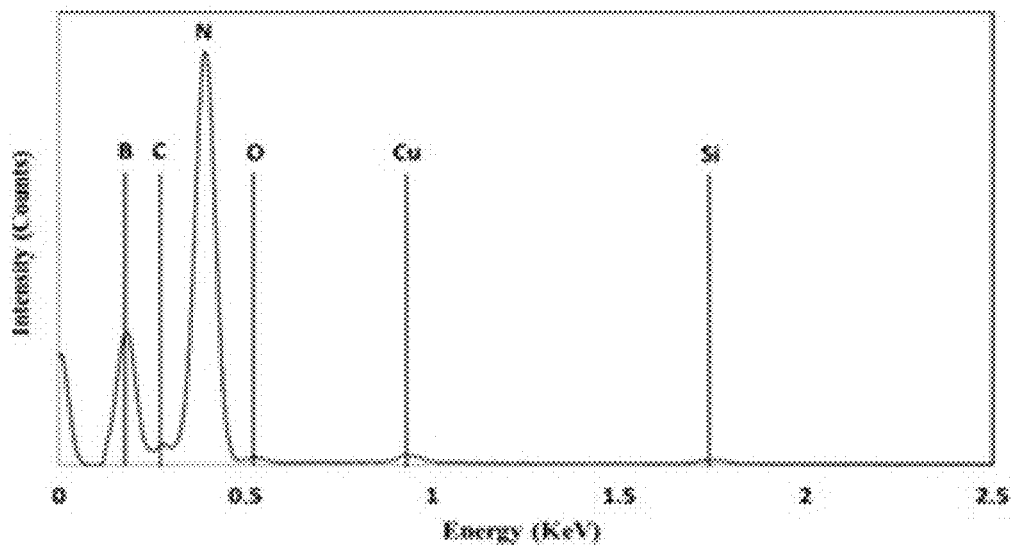
FIG. 5 illustrates EDS spectrum of BN nano-pellets.

Nano-pellets were found nearer to the lamp's focal point compared to the nano-onions described below and would appear to be an intermediate stage in the transformation of the precursor BN material to the final nanostructures. The fact that the nanostructures primarily comprise boron and nitrogen is evidenced by the energy-dispersive x-ray spectroscopy (EDS) spectrum (FIG. 5).

The section of the quartz ampoule approximately 12-16 cm from the lamp focus revealed remarkable clusters of hollow BN nanospheres (nano-onions) with diameters of 50-100 nm.

Figure 6:
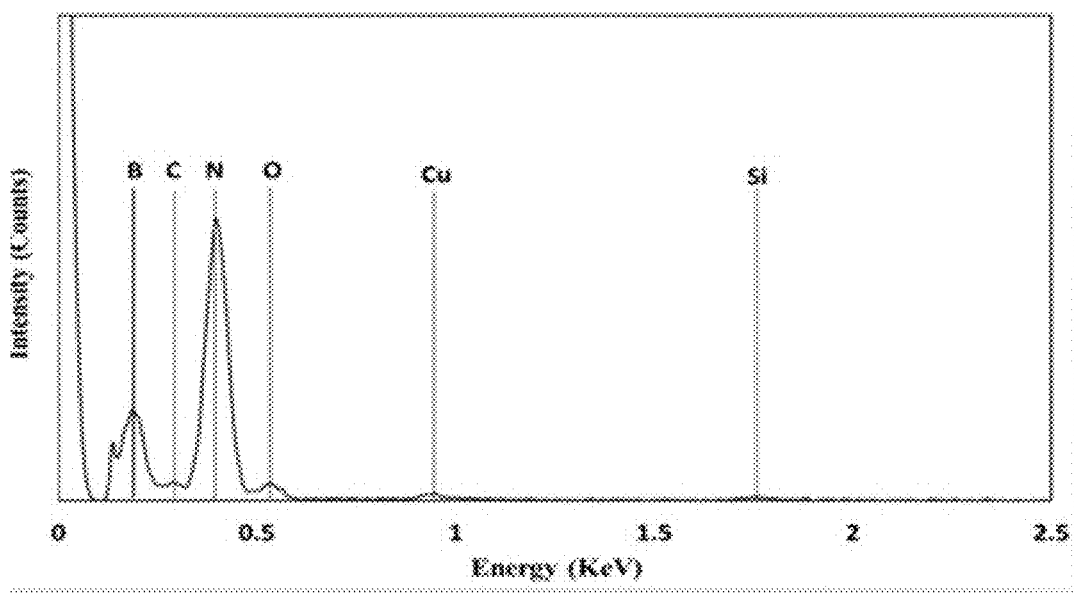
FIG. 6 illustrates EDS spectrum of a BN nano-onion.

Results from the 30-minute ablation experiment exhibited no noticeable differences relative to the 50-minute exposure, including the observation that the BN nano-onions were found principally at a similar distance (12-16 cm) from the focal region. The diameters of the structures range from 20-60 nm. The applied difference in irradiation time had no perceptible effect on the size or shape of the nano-onions. The fact that the nano-onions primarily comprise boron and nitrogen is evidenced by the energy-dispersive x-ray spectroscopy (EDS) spectrum (FIG. 6). The appearance of carbon and copper in the EDS spectrum (FIG. 6) can be explained as background from the copper TEM grid having a porous carbon film. The presence of silicon and oxygen is due to tiny quartz shards produced from cutting the ampoule during sample preparation.

Figure 7A:
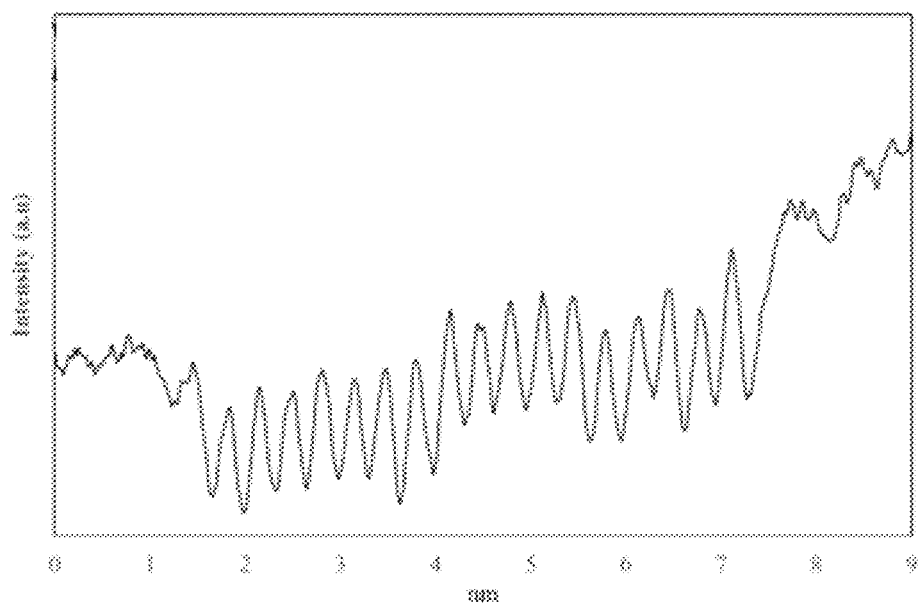
FIG. 7A illustrates a Line profile on the wall of a BN nano-onion and FIG. 7B illustrates a Line profile through a single BN nano-onion.
Figure 7B:
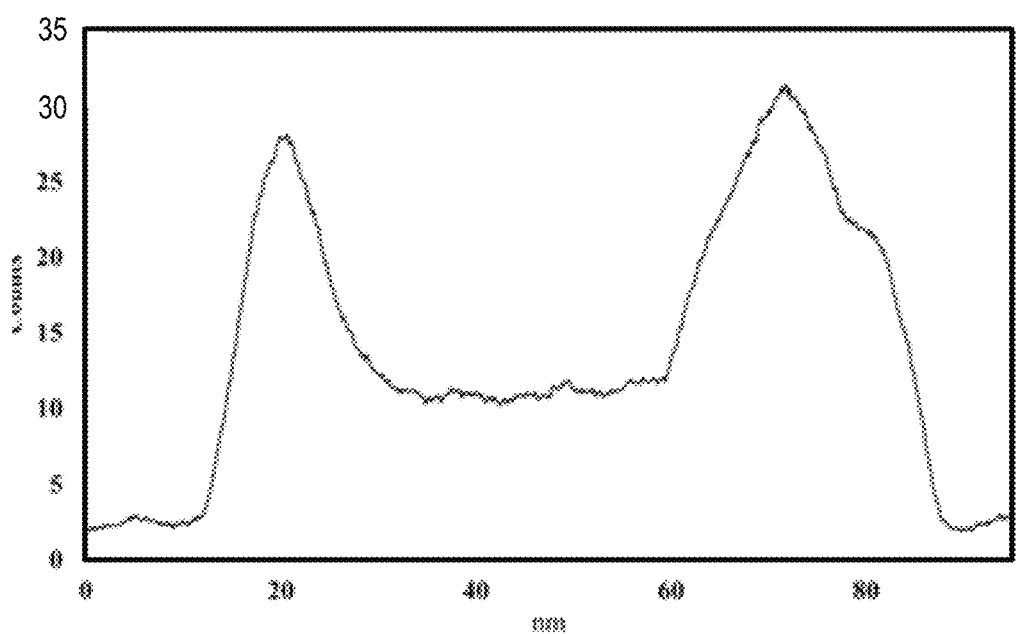

FIG. 7(a) illustrates the profile taken along the wall of a BN nano-onion. The FFT (not shown), together with the line profile, is used to estimate an inter-layer spacing of 0.335 nm, which accords well with the established (002) lattice spacing of h-BN. FIG. 7(b) shows the line profile taken through a single nano-onion. The variation in counts in the profile is closely related to the relative thickness, reinforcing that the nano-onions are in fact hollow.

Electron energy loss spectroscopy (EELS) analysis of the BN nano-onions shows the distinct absorption peaks of B and N: characteristic K-shell ionisation edges at 188 and 401 eV, respectively. The sharp $\pi^*$ and $\sigma^*$ peaks of the B and N K-edges are characteristic of the $sp^2$ bonding configuration, underscoring the h-BN structure. The carbon absorption peak at 284 eV can be attributed to the carbon film on the TEM copper grid.

Figure 8A:
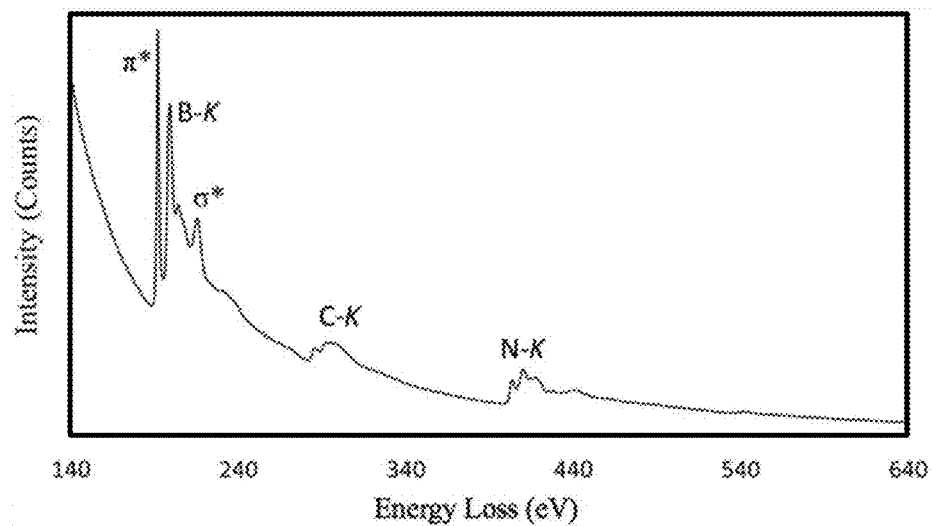
FIG. 8A illustrates EELS spectrum from the wall (shell) and FIG. 8B illustrates EELS spectrum from a center of an individual BN nano-onion.
Figure 8B:
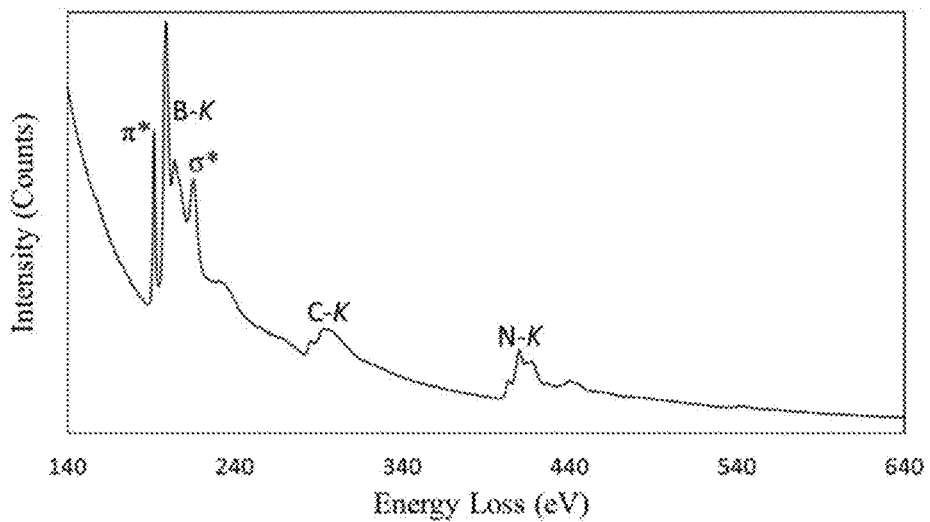

A quantitative analysis of the spectrum shows a B/N atomic ratio of 1.00±0.02. In the EELS spectrum, the change in the relative intensities of the $\pi^*$ and $\sigma^*$ peaks between the wall and the centre of the nano-onions (FIGS. 8(a) and (b)) are due to the orientation-sensitive nature of $sp^2$-hybridised BN in the EELS microanalysis.

A variety of other BN nanostructures were discovered in the same region of the ampoule, mainly nano-platelets and exfoliated nano-sheets. The nano-platelets are two-dimensional, with diameters of approximately 50 nm. Numerous nano-onion structures that did not fully close were found around the edges of the exfoliated sheets.

More subtle nanostructures, such as nano-horns and nano-rods were also observed.

Furthermore, nano-rod and concentric tubular nanostructures were found.

Figure 9:
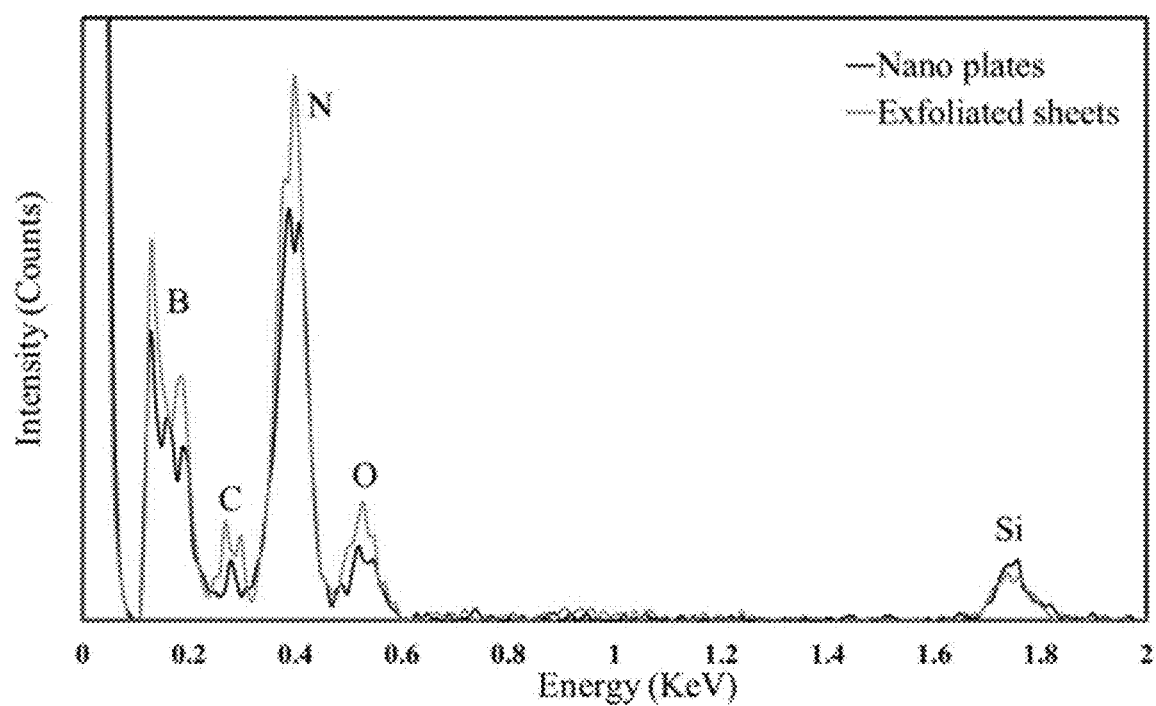
FIG. 9 illustrates EDS spectrum of nano-platelets and exfoliated sheets of BN.

The elements present in both the nano-platelets and nano-sheets are clear from the EDS spectrum in FIG. 9, dominated by B and N. The presence of Si and O can be attributed to shards from the cut quartz reactor ampoules (vide supra), and the presence of C is due to the carbon film on the copper TEM grid.

Without wishing to be limited by theory, a formation mechanism for such nanostructures that is not inconsistent with the experimental observations (FIG. 1) is that exfoliated and vaporised h-BN condenses into a variety of structures, which change their morphology to form the lower-energy hollow nano-onions. The h-BN precursor could initially form plate-like circular nanostructures of BN which exfoliate into thinner sheets of BN and could then rearrange into more stable nano-onions at a cooler section of the vessel some distance away from the focal point of the lamp. The photo-thermal transformation is driven by the adiabatic radiative shielding environment within the vessel that permits slow cooling of the ablated material. The supporting evidence is based on the numerous incompletely-closed nano-onions found lining the exfoliated sheets that both the plate-like nanostructures, as well as the exfoliated sheets, have dimensions comparable to the nano-onions.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A method for producing boron nitride nanostructures, the method comprising subjecting boron nitride precursor material to multiple lamp ablation exposures within an adiabatic radiative shielding environment.

2. The method according to claim 1, wherein the nanostructures produced comprise nano-onion structures.

3. The method according to claim 1, wherein the nanostructures produced comprise at least 50 wt % nano-onion structures.

4. The method according claim 1, wherein the boron nitride precursor material subjected to lamp ablation comprises amorphous boron nitride, hexagonal boron nitride, cubic boron nitride, wurtzite boron nitride or a combination of two or more thereof.

5. The method according to claim 1, wherein the boron nitride precursor material subjected to lamp ablation comprises hexagonal boron nitride.

6. The method according to claim 1, wherein the boron nitride precursor material subjected to lamp ablation comprises boron nitride nano-horns, boron nitride nano-rods, boron nitride nano-tubes, boron nitride nano-sheets, boron nitride nano-platelets, boron nitride nano-onions or a combination of two or more thereof.

7. The method according to claim 1, wherein the boron nitride precursor material subjected to lamp ablation is rotated within lamp emission that provides for the lamp ablation.

8. The method according to claim 1, wherein the lamp ablation is performed using a xenon gas-discharge lamp.

9. The method according to claim 1, wherein the lamp ablation is performed using an ellipsoidal mirror to focus lamp emission onto the boron nitride precursor material.

10. The method according to claim 1, wherein the boron nitride precursor material is subjected to lamp ablation for at least 5 minutes.

11. The method according to claim 1, wherein the boron nitride precursor material is subjected to lamp ablation at a pressure less than atmospheric pressure.

12. The method according to claim 1, wherein the boron nitride precursor material is subjected to lamp ablation at a temperature in the range between about 1,400° C. and about 3,500° C.

13. The method according to claim 1, wherein the nanostructures produced comprise nano-platelet structures.

14. The method according to claim 1, wherein the nanostructures produced comprise nano-rod structures.

15. The method according to claim 1, wherein the nanostructures produced comprise nano-horn structures.

16. The method according to claim 1, wherein the nanostructures produced are crystalline.

17. The method according to claim 1, wherein the adiabatic radiative shielding environment is in the form of a vessel comprising fused quartz.

18. The method according to claim 17, wherein the vessel containing the boron nitride precursor material is at or proximate to a focal point of a lamp that provides for the lamp ablation.

19. The method according to claim 18, wherein the boron nitride nanostructures so produced are formed within the vessel about 6 cm to about 30 cm away from the focal point of the lamp.

20. The method according to claim 17, wherein the vessel is hermetically sealed and has two or more layers of material which are each spaced apart and each hermetically sealed.

* * * * *